United States Patent
Balluru et al.

(10) Patent No.: US 9,311,301 B1
(45) Date of Patent: Apr. 12, 2016

(54) SYSTEMS AND METHODS FOR LARGE SCALE GLOBAL ENTITY RESOLUTION

(71) Applicant: Digital Reasoning Systems, Inc., Franklin, TN (US)

(72) Inventors: Vishnuvardhan Balluru, Franklin, TN (US); Kenneth Graham, Nashville, TN (US); Naomi Hilliard, Nashville, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 0 days.

(21) Appl. No.: 14/750,936

(22) Filed: Jun. 25, 2015

Related U.S. Application Data

(60) Provisional application No. 62/017,937, filed on Jun. 27, 2014.

(51) Int. Cl.
*G06F 17/28* (2006.01)
*G06N 99/00* (2010.01)
(Continued)

(52) U.S. Cl.
CPC ............ *G06F 17/28* (2013.01); *G06F 17/2765* (2013.01); *G06N 7/005* (2013.01); *G06N 99/005* (2013.01)

(58) Field of Classification Search
CPC ............ G06F 17/2785; G06F 17/2705; G06F 17/271; G06F 17/28; G06F 17/2775; G06F 17/278
USPC .............................................................. 704/9
See application file for complete search history.

(56) References Cited

U.S. PATENT DOCUMENTS

| | | | |
|---|---|---|---|
| 7,249,117 B2 | 7/2007 | Estes | |
| 7,882,055 B2 | 2/2011 | Estes | |
| 8,015,143 B2 * | 9/2011 | Estes | .............................. 706/52 |

(Continued)

FOREIGN PATENT DOCUMENTS

WO      2009051987 A1     4/2009

OTHER PUBLICATIONS

"Cosine Similarity", available online at: http://en.wikipedia.org/wiki/Cosine_similarity; accessed Mar. 6, 2015.
(Continued)

*Primary Examiner* — Douglas Godbold
(74) *Attorney, Agent, or Firm* — Troutman Sanders LLP; Ryan A. Schneider; Christopher W. Glass

(57) ABSTRACT

Systems and methods for coreference resolution are disclosed. In one embodiment, a method includes locating, for each of a selected plurality of chains of coreferent mentions, a particular context-based name from the respective chain, wherein the coreferent mentions correspond to entities and the context-based name is a longest name in the respective chain, a last name in the respective chain, or a most frequently occurring name in the respective chain. The method also includes determining an entity category for each respective one of the plurality of chains and determining one or more entity attributes from structured data and unstructured data. The method further includes, based on the located particular context-based name, the entity category, and the one or more attributes, assigning high-probability coreferent chains to high-confidence buckets, such as to produce a Zipfian-like distribution having a head region and a tail region.

30 Claims, 9 Drawing Sheets

(51) Int. Cl.
*G06N 7/00* (2006.01)
*G06F 17/27* (2006.01)

(56) References Cited

U.S. PATENT DOCUMENTS

| | | | |
|---|---|---|---|
| 8,285,725 | B2 | 10/2012 | Bayliss |
| 8,290,968 | B2 | 10/2012 | Jonas |
| 8,352,388 | B2 | 1/2013 | Estes |
| 8,370,355 | B2 * | 2/2013 | Harger et al. ............... 707/737 |
| 8,423,525 | B2 | 4/2013 | Jonas |
| 8,457,950 | B1 * | 6/2013 | Gardner et al. ............... 704/9 |
| 8,510,323 | B2 | 8/2013 | Eshwar et al. |
| 9,009,029 | B1 * | 4/2015 | Michalak et al. ............... 704/9 |
| 2005/0108001 | A1 * | 5/2005 | Aarskog ............... 704/10 |
| 2009/0326919 | A1 * | 12/2009 | Bean ............... 704/9 |
| 2012/0215808 | A1 | 8/2012 | Allen et al. |
| 2013/0124435 | A1 | 5/2013 | Estes |
| 2014/0067363 | A1 * | 3/2014 | Ogren et al. ............... 704/2 |

OTHER PUBLICATIONS

"Zipf's Law", available online at: http://en.wikipedia.org/wiki/Zipf's_law; accessed Mar. 4, 2015.
György Dán et al., "Power-law Revisited: Large Scale Measurement Study of P2P Content Popularity." IPTPS; Apr. 2010.
"Wiki-links Data," available online at: http://code.google.com/p/wiki-links/downloads/list; accessed Mar. 4, 2015.
Sameer Singh et al., "Wikilinks: A Large-scale Cross-Document Coreference Corpus Labeled via Links to Wikipedia"; Oct. 2012.
Freebase, available online at: http://www.freebase.com; accessed Mar. 4, 2015.

* cited by examiner

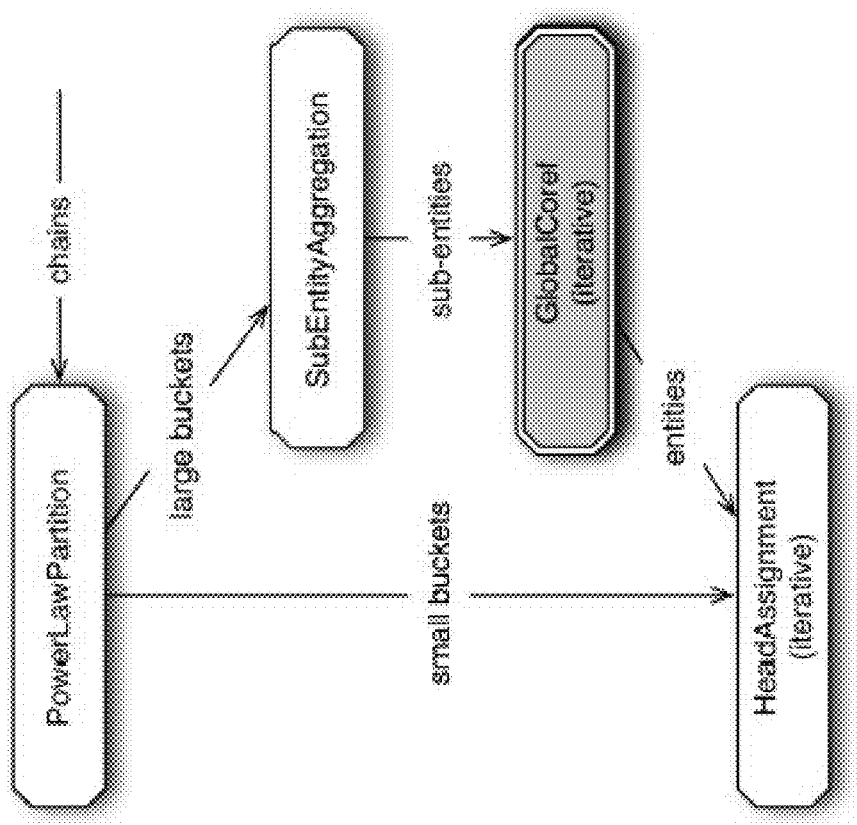
FIG. 5
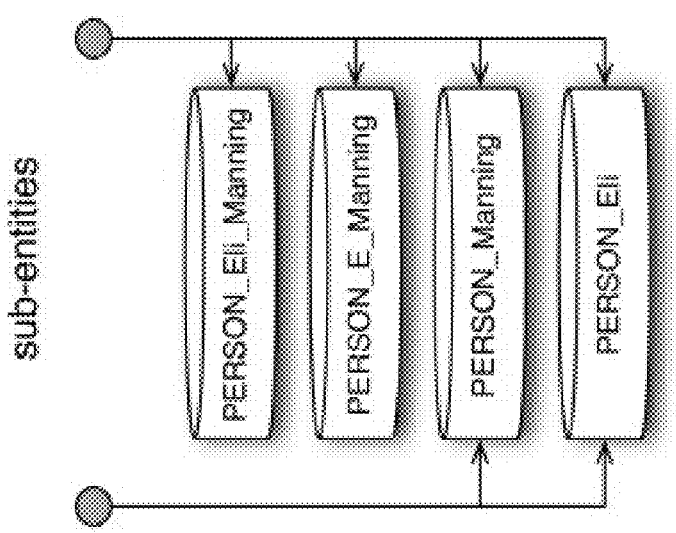

SYSTEMS AND METHODS FOR LARGE SCALE GLOBAL ENTITY RESOLUTION

CROSS-REFERENCE TO RELATED APPLICATION

This Application claims priority to and benefit under 35 U.S.C. §119(e) of U.S. Provisional Patent Application Ser. No. 62/017,937, filed Jun. 27, 2014, which is hereby incorporated by reference herein in its entirety as if fully set forth below.

BACKGROUND

In the field of natural language processing, coreference resolution can generally be defined as a process of determining whether two expressions (or "mentions") in natural language text refer to the same object (or "entity"). Given a collection of mentions of entities extracted from a body of text, coreference resolution, sometimes also referred to as entity resolution, may group the mentions such that two mentions belong to the same group if and only if they refer to the same entity. With the number of mentions and entities present within text of documents to be processed reaching into the millions or billions, conventional coreference: resolution processes may be very computationally demanding and excessively time consuming. Maintaining precision in cross-document resolution on large scale data is also a challenge. It is with respect to these and other considerations that aspects of the present disclosure are presented herein.

SUMMARY

In one aspect, the present disclosure relates to a computer-implemented method which, in one embodiment, includes locating, for each of a selected plurality of chains of coreferent mentions, a particular context-based name from the respective chain, wherein the coreferent mentions correspond to entities and the context-based name is a longest name in the respective coreference chain, a last name in the respective coreference chain, or a most frequently occurring name in the respective coreference chain. The method also includes determining an entity category for each respective one of the plurality of chains, and determining one or more entity attributes from structured data and unstructured data. The method further includes, based on the located particular context-based name, the entity category, and the one or more attributes, assigning high-probability coreferent chains to high-confidence buckets, such as to produce a Zipfian-like distribution having a head region and a tail region.

The Zipfian-like distribution can be produced such that the respective rank of a particular chain corresponding to a context-based name is inversely proportional to the frequency of the context-based name across a document corpus. Assigning the high-probability chains to the high-confidence buckets can include: grouping the plurality of chains based on the respective context-based name and category such that chains having the same context-based name and same category are grouped together into a respective partition; within the respective partition, grouping chains that correspond to the same concept into sub-entities; and grouping together, across and within partitions, the sub-entities that correspond to the same concept.

In one embodiment, the method further includes assigning one or more low-frequency sub-entities into the head region, and assigning one or more high-frequency sub-entities into the tail region, wherein the low-frequency sub-entities correspond to mentions that occur less frequently across a document corpus than the mentions corresponding to the high-frequency sub-entities. In this embodiment, the method can also include: performing iterative global coreference resolution functions on the sub-entities assigned to the tail region, based on similarity comparison functions; performing, in a fully distributed computing environment, shuffling functions on the sub-entities assigned to the tail region such as to improve the rate of coreference resolution; applying a high-pass filter to generate only high-confidence resolved entities at the end of each iteration of performing the iterative global coreference functions; and performing feature aggregation to produce representations of entities from coreferent sub-entities. The method can also include selecting iterative random combinations of sub-entities based on similarity comparisons between sub-entities of the head region and based on the entities created from the tail region's coreferent sub-entities.

In one embodiment, the method can include determining overlap of incoming data with data in an existing coreference hierarchy by assigning the high-probability coreferent chains to the high-confidence buckets and performing computations on an overlapping region of the distribution that corresponds to the determined overlap, and restoring the computations from the previous state for the remainder of the head region and tail region. In this embodiment, the method can further include performing best entity guesses for the newly-computed sub-entities in the overlapping region to aid resolution, the best entity guesses corresponding to an estimation of an entity to which each of the newly-computed sub-entities corresponds.

In one embodiment, the method can include persisting the entity data structures and performing random sampling algorithm functions based on predetermined similarity comparisons and intelligent shuffling between new incoming data and the persisted entities from previous runs. In this embodiment, the method may also include creating new entities on an as-needed basis for further runs.

In one embodiment, the method can include computing, using one or more similarity functions, one or more similarity metrics corresponding to at least one of contextual similarity, name similarity, title similarity, and attribute similarity simultaneously to determine coreference of a pair of sub-entities or a pair of entities.

In one embodiment, the method can include generating, based on the assigning of the high-probability coreferent chains to high-confidence buckets, candidates for structured entities, and determining overlap between identified high-confidence buckets of both structured data and unstructured data. In this embodiment, the method can also include, for non-zero overlap, allotting structured entities to the tail region and, for trivial overlap, allotting structured entities in the head region such as to enhance a rate of the unstructured-structured data resolution.

In another aspect, the present disclosure relates to a system. In one example embodiment, the system includes one or more processors and a memory device coupled to the one or more processors. The memory device stores instructions that, when executed by the one or more processors, cause the system to perform functions that include locating, for each of a selected plurality of chains of coreferent mentions, a particular context-based name from the respective chain, wherein the coreferent mentions correspond to entities and the context-based name is a longest name in the respective coreference chain, a last name in the respective coreference chain, or a most frequently occurring name in the respective coreference chain. The functions performed further include determining an entity category for each respective one of the plurality of chains, and determining one or more entity attributes from structured data and unstructured data. The functions performed further include, based on the located particular context-based name, the entity category, and the one or more attributes, assigning high-probability coreferent chains to high-confidence buckets, such as to produce a Zipfian-like distribution having a head region and a tail region.

The Zipfian-like distribution can be produced such that the respective rank of a particular chain corresponding to a context-based name is inversely proportional to the frequency of the context-based name across a document corpus. Assigning the high-probability chains to the high-confidence buckets can include: grouping the plurality of chains based on the respective context-based name and category such that chains having a same context-based name and same category are grouped together into a respective partition; within the respective partition, grouping chains that correspond to the same concept into sub-entities; and grouping together, across and within partitions, the sub-entities that correspond to the same concept.

In one embodiment, the functions performed further include assigning one or more low-frequency sub-entities into the head region, and assigning one or more high-frequency sub-entities into the tail region, wherein the low-frequency sub-entities correspond to mentions that occur less frequently across a document corpus than the mentions corresponding to the high-frequency sub-entities. In this embodiment, the functions performed can also include: performing iterative global coreference resolution functions on the sub-entities assigned to the tail region, based on similarity comparison functions; performing, in a fully distributed computing environment, shuffling functions on the sub-entities assigned to the tail region such as to improve the rate of coreference resolution; applying a high-pass filter to generate only high-confidence resolved entities at the end of each iteration of performing the iterative global coreference functions; and performing feature aggregation to produce representations of entities from coreferent sub-entities. The functions performed can also include selecting iterative random combinations of sub-entities based on similarity comparisons between sub-entities of the head region and based on the entities created from the coreferent sub-entities of the tail region.

In one embodiment, the functions performed can include determining overlap of incoming data with data in an existing coreference hierarchy by assigning the high-probability coreferent chains to the high-confidence buckets and performing computations on an overlapping region of the distribution that corresponds to the determined overlap, and restoring the computations from the previous state for the remainder of the head region and tail region. In this embodiment, the functions performed can further include performing best entity guesses for the newly-computed sub-entities in the overlapping region to aid resolution, the best entity guesses corresponding to an estimation of an entity to which each of the newly-computed sub-entities corresponds.

In one embodiment, the functions performed can include persisting the entity data structures and performing random sampling algorithm functions based on predetermined similarity comparisons and intelligent shuffling between new incoming data and the persisted entities from previous runs. In this embodiment, the functions performed can also include creating new entities on an as-needed basis for further runs.

In one embodiment, the functions performed can include computing, using one or more similarity functions, one or more similarity metrics corresponding to at least one of contextual similarity, name similarity, title similarity, and attribute similarity simultaneously to determine coreference of a pair of sub-entities or a pair of entities.

In one embodiment, the functions performed can include generating, based on the assigning of the high-probability coreferent chains to high-confidence buckets, candidates for structured entities, and determining overlap between identified high-confidence buckets of both structured data and unstructured data. In this embodiment, the functions performed can also include, for non-zero overlap, allotting structured entities to the tail region and, for trivial overlap, allotting structured entities in the head region such as to enhance a rate of the unstructured-structured data resolution.

In yet another aspect, the present disclosure relates to a non-transitory computer-readable medium storing instructions that, when executed by one or more processors, cause a computer to perform functions that include locating, for each of a selected plurality of chains of coreferent mentions, a particular context-based name from the respective chain, wherein the coreferent mentions correspond to entities and the context-based name is a longest name in the respective coreference chain or a last name in the respective coreference chain. The functions performed further include determining an entity category for each respective one of the plurality of chains, and determining one or more entity attributes from structured data and unstructured data. The functions performed further include, based on the located particular context-based name, the entity category, and the one or more attributes, assigning high-probability coreferent chains to high-confidence buckets, such as to produce a Zipfian-like distribution having a head region and a tail region.

The Zipfian-like distribution can be produced such that the respective rank of a particular chain corresponding to a context-based name is inversely proportional to the frequency of the context-based name across a document corpus. Assigning the high-probability chains to the high-confidence buckets can include: grouping the plurality of chains based on the respective context-based name and category such that chains having a same context-based name and same category are grouped together into a respective partition; within the respective partition, grouping chains that correspond to the same concept into sub-entities; and grouping together the sub-entities that correspond to the same concept.

In one embodiment, the functions performed further include assigning one or more low-frequency sub-entities into the head region, and assigning one or more high-frequency sub-entities into the tail region, wherein the low-frequency sub-entities correspond to mentions that occur less frequently across a document corpus than the mentions corresponding to the high-frequency sub-entities. In this embodiment, the functions performed can also include: performing iterative global coreference resolution functions on the sub-entities assigned to the tail region, based on similarity comparison functions; performing, in a fully distributed computing environment, shuffling functions on the sub-entities assigned to the tail region such as to improve the rate of coreference resolution; applying a high-pass filter to generate only high-confidence resolved entities at the end of each iteration of performing the iterative global coreference functions; and performing feature aggregation to produce representations of entities from coreferent sub-entities. The functions performed can also include selecting iterative random combinations of sub-entities based on similarity comparisons between sub-entities of the head region and based on the entities created from the coreferent sub-entities.

In one embodiment, the functions performed can include determining overlap of incoming data with data in an existing coreference hierarchy by assigning the high-probability coreferent chains to the high-confidence buckets and performing computations on an overlapping region of the distribution that corresponds to the determined overlap, and restoring the computations from the previous state for the remainder of the head region and tail region. In this embodiment, the functions performed can further include performing best entity guesses for the newly-computed sub-entities in the overlapping region to aid resolution, the best entity guesses corresponding to an estimation of an entity to which each of the newly-computed sub-entities corresponds.

In one embodiment, the functions performed can include persisting the entity data structures and performing random sampling algorithm functions based on predetermined similarity comparisons and intelligent shuffling between new incoming data and the persisted entities from previous runs. In this embodiment, the functions performed can also include creating new entities on an as-needed basis for further runs.

In one embodiment, the functions performed can include computing, using one or more similarity functions, one or more similarity metrics corresponding to at least one of contextual similarity, name similarity, title similarity, and attribute similarity simultaneously to determine coreference of a pair of sub-entities or a pair of entities.

In one embodiment, the functions performed can include generating, based on the assigning of the high-probability coreferent chains to high-confidence buckets, candidates for structured entities, and determining overlap between identified high-confidence buckets of both structured data and unstructured data. In this embodiment, the functions performed can also include, for non-zero overlap, allotting structured entities to the tail region and, for trivial overlap, allotting structured entities in the head region such as to enhance a rate of the unstructured-structured data resolution.

In yet another aspect, the present disclosure relates to a computer-implemented method that, in one embodiment, includes, for a segment of text data comprising a plurality of mentions, activating, from a plurality of semantic and syntactic features that are valid for comparing a particular pair of mentions of the plurality of mentions, only a subset of the valid features. In this embodiment, the method also includes comparing the pair of mentions to each other based on the activated subset of valid features such as to determine whether the pair of mentions refer to the same entity. The plurality of syntactic features can include string match, string mismatch, substring match, substring mismatch, acronym match, and/or partial name match. The plurality of semantic features can include same sentence, previous sentence, next sentence, and/or category match. In other aspects, the present disclosure relates to a system and computer-readable medium for performing the functions of the computer-implemented method.

BRIEF DESCRIPTION OF THE DRAWINGS

FIG. 5 illustrates grouping of output into corpus level entities, according to some example embodiments of the present disclosure.

DETAILED DESCRIPTION

Figure 1:
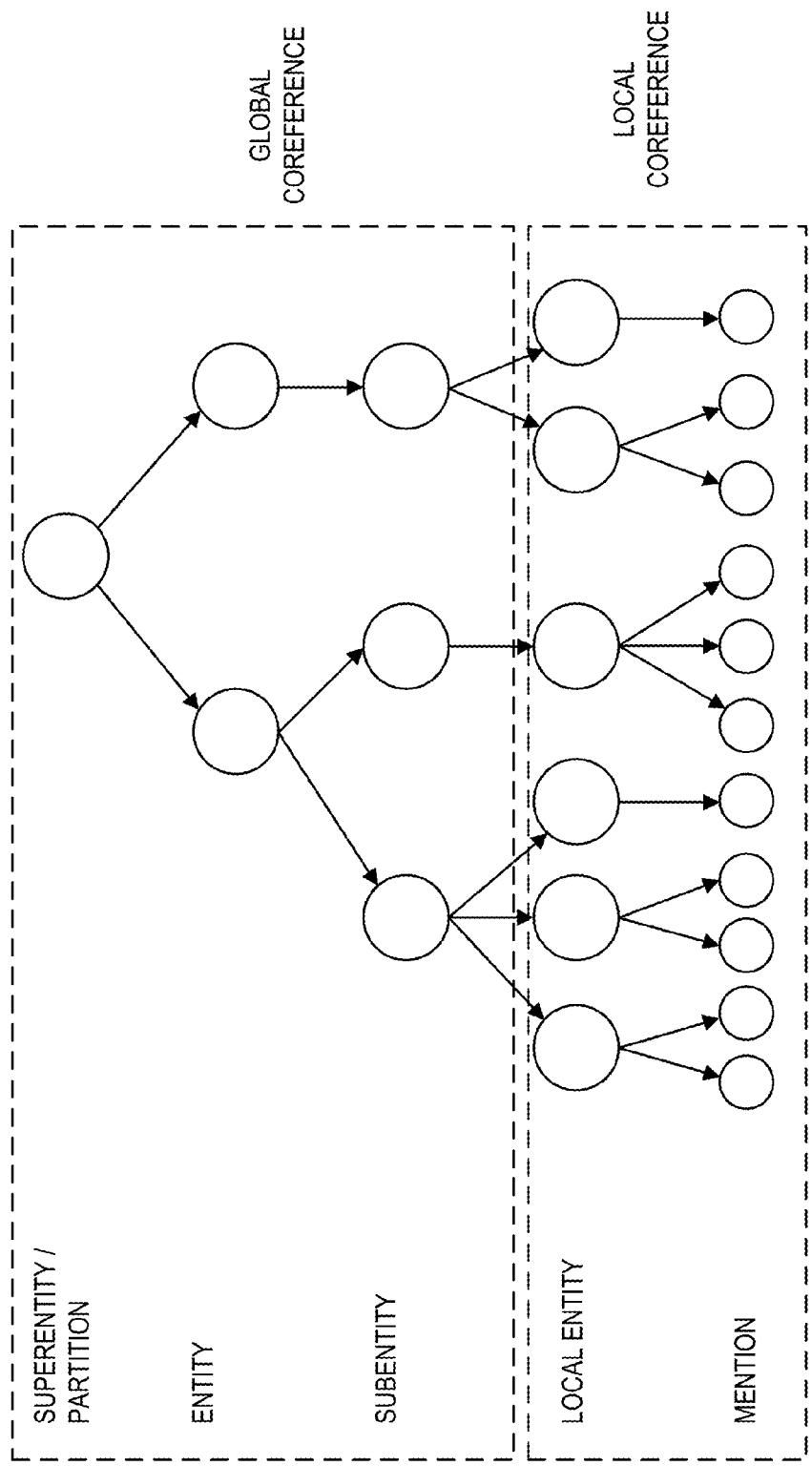
FIG. 1 illustrates an entity coreference hierarchy.

Some references, which may include patents and/or various publications, are discussed in the disclosure provided herein. The citation and/or discussion of such references is provided merely to clarify the description of the present disclosure and is not an admission that any such reference is "prior art" to any aspects of the present disclosure described herein. All references cited and discussed in this specification are incorporated herein by reference in their entireties and to the same extent as if each reference was individually incorporated by reference. In terms of notation, hereinafter, "[n]" may represent the nth reference cited in the reference list. For example, [6] represents the 6th reference cited in the reference list, namely, Sameer Singh et al., "Wikilinks: A Large-scale Cross-Document Coreference Corpus Labeled via Links to Wikipedia" (October 2012).

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

The following provides non-limiting definitions of some terms used herein in describing certain aspects of the present disclosure, for convenience of the reader.

As referred to herein, a "bucket" may refer to a collection having a specific identifier ("id") in order to group high likelihood in-document coreferent chains. A bucket may contain sub-entities which all have the same specific identifier created by a version of the name and entity category.

As used herein, a "contextual feature" can be a feature that captures the context surrounding a mention. A contextual feature may comprise entity categories and features at the word level in a sentence.

As used herein, "coreference resolution" or "entity resolution" may refer to a process of determining whether two expressions (or "mentions") in natural language refer to the same entity.

As used herein, a "local coreference chain" (or "coref chain") may refer to one or more textual references to an entity local to a document.

As used herein, an "entity" may refer to a set of mentions that constitute an unambiguous identity of a person, group, thing, or idea. An entity may be a group of coreferent "sub-entities", which may also be referred to as a "concept".

As used herein, a "feature" may refer to a value derived from examination of the context of a concept, relationships, and messages. A feature can be explicitly in the message or inferred through analytics.

As used herein, a "feature vector" may refer to an n-dimensional vector of features, such as numerical features, that can represent some element (or mention). Some machine learning processes described herein may utilize numerical representation of objects to facilitate processing and statistical analysis.

As used herein, a "lexicon" may refer to a list of like-typed pieces of information that can be identified within text, for example unstructured text in a document. In some embodiments described herein, lexicons can provide useful features for core natural language processes. A lexicon may be a list or library of pre-established terms with a correspondence of known entities and their respective category types.

As used herein, "local entity" may refer to a group of in-document coreferent mentions, which may also be referred to as a local coreference chain.

As used herein, a "mention" may refer to a reference to a value in a position in a message that has been processed. A mention as used herein may additionally or alternatively refer to a data object that represents a chunk, which can contain information such as token start, token end, etc. and features that aid in resolution.

As used herein, a "message" may refer to an ordered collection of values.

As used herein, a "non-contextual feature" may refer to features which are constant for a given word regardless of the context. Non-contextual feature vectors may comprise tokenizer output and features at the character level for a given word.

As used herein, "reasoning" may refer to the use or manipulation of concepts and relationships to answer end user questions. Reasoning may be primitive (atomic) or complex (orchestrated to support a specific business use case).

As used herein, a "relationship" may refer to an n-tuple of concepts or relationships (i.e. relationships can be recursive). A relationship can have a value as a label.

As used herein, "resolution" may refer to the determination of a set or all references to create concepts or relationships.

As used herein, "sub-entity" may refer to a group of coreferent "local entities". A sub-entity may also be the atomic unit of input for iterative global coreference processes as described in the present disclosure.

As used herein, "super-entity" may refer a coarse-grained cluster. 'Person' mentions, for example, can be part of a larger 'person' super-entity. As a further example, all mentions belonging to a 'politics' category can be part of one large super-entity. Super-entities can be used for minimizing a search space.

In the following detailed description, references are made to the accompanying drawings that form a part hereof and that show, by way of illustration, specific embodiments or examples. In referring to the drawings, like numerals represent like elements throughout the several figures.

Certain aspects of the present disclosure generally relate to processing text-related data that may be taken from one or more documents, messages, metadata, or other structured or unstructured data sources. In some embodiments, ingested text data can be broken up into its foundational building blocks using various natural language processing (NLP) functions, which may determine sentence boundaries and then break up the text into tokens. Each token can consist of a word, punctuation mark, or special character. Each token can then be analyzed and assigned a grammatical part of speech (POS) tag (e.g., proper noun, adjective, adverb).

The tokens can be further analyzed to determine if adjacent tokens should be co joined together if they describe the same concept. For example, if "John" and "Smith" were adjacent to each other, they can be co joined to form "John Smith" as a single entity. Other types of examples can include titles or company names. This process may be referred to as chunking, which creates the elements (or entities) that can be used by downstream analytics. Each chunk may then be analyzed to determine if it belongs to a predefined category. Examples of categories can include people, organizations, businesses, and vehicles. A library (e.g., lexicon) of predefined categories may be provided, or users may create their own custom categories using training applications. Upon completion of various initial NLP functions, the text may be broken down into its constituent parts, forming a basic foundation of contextual meaning. Using this foundation, other analytic functions may then be performed, such as coreference resolution functions as will be described in further detail below with respect to certain embodiments of the present disclosure.

In some embodiments of the present disclosure, functions of language processing can be implemented using probabilistic mathematical models through supervised and/or unsupervised model-based machine learning. The models can encode a variety of different data features and associated weight information, which may be stored in a network-based file system and can be used to reconstruct a model at run time. Features may be contextual or non-contextual. Contextual features may comprise extractor tags and features at the word level in the sentence. Non-contextual features can be considered as those features which are constant for a given word regardless of the context. Non-contextual features may comprise tokenizer output and features at the character level for a given word, as opposed to a widely known word level in each sentence. The features utilized by these models may be determined by linguists and developers, and may be fixed at model training time. Models can be retrained at any time, but retraining may be done more infrequently once models reach certain levels of accuracy. Such approaches can be used to capture linguistic phenomena by utilizing the models to label sequences of characters/tokens/elements with the correct linguistic information that a model was created to predict. According to some embodiments of the present disclosure, a supervised approach can comprise two phases: a training phase to identify those features that are significant for determining the correct label sequencing implemented by that model, and a run-time labeling phase that employs inference algorithms to assign attributes to the text being processed.

As briefly described above, coreference resolution can generally refer to a process of determining whether two expressions or mentions in natural language text refer to the same entity. Given a collection of mentions of entities extracted from a body of text, mentions may be grouped such that two mentions belong to the same group (cluster) if they refer to the same entity. It may be recognized that an entity is coreferent with and refers to the same entity or that information associated with the entity is referring to multiple distinct real-world individuals. Coreference resolution according to embodiments of the present disclosure can address an existing problem of identifying the correct entity named by each mention (e.g., names, pronoun, and noun references). As shown in the coreference hierarchy diagram of FIG. 1 and as discussed with reference to various embodiments below, an entity can be a group of coreferent sub-entities, and a sub-entity can be a group of coreferent local entities. A super-entity can be a group of coreferent entities.

Training can be performed by passing annotated data, such as annotated text data corresponding to text from a document, to a machine-learning training algorithm that creates an appropriate model. This annotated data can be represented as vectors of features ("feature vectors"). As briefly described above, a feature vector may refer to an n-dimensional vector of features that represent some element or mention. Such machine-learning training algorithms can learn the weights of features and persist them in a model such that inference algorithms can utilize the model to predict a correct label sequence to assign to the terms as they are being processed. These label sequences can overlap with one another. To illustrate, labels emitted by a phrase detection component contains a sequence of words (i.e., a phrase) which are labeled by token reduction emitted by a word detection component, where each word is a token. A named entity recognition component can label word sets that are contained within a phrase label. For example, "newly elected President Barack Obama" can be identified as a phrase, by the phrase detection component, and "Barack Obama" can be identified as a named person by the named entity recognition component. "President" can be identified as a title (by a title detection component). Each such phrase can be referred to as a mention. In some embodiments of the present disclosure, mentions are resolved first on a per-document level first, and then corresponding local coreferent chains are into a global analytic that resolves the chains on a corpus level. Finally, the components can be grouped together to yield fewer components.

According to some embodiments of the present disclosure, two mentions are randomly chosen and a determination is made as to whether the two mentions are coreferent. This process may be referred to as a "proposal", and the proposal (new state) is accepted if the two mentions are deemed coreferent by the system; otherwise the proposal is rejected. Such process can be repeated until performing additional comparisons will not increase the accepted proposals within certain predetermined bounds. To be able to perform global entity resolution on a large scale (e.g., on "Big Data"), the precision of the local coreference determinations need be very high. Otherwise, when smaller errors are aggregated on a large scale, global concepts with contradicting resolution can result.

Existing techniques may use various features such as "string match", "string mismatch, substring," "same sentence", and/or "previous sentence", among others, to determine coreference. In a supervised framework, for a given pair of mentions to be compared, a number of such features are generated during runtime and coreference is determined via inference that makes use of weights that are learned for these features during training time. In an unsupervised framework, a rule-based approach may be used for comparing such a pair of mentions.

According to some embodiments of the present disclosure, only a subset of features are generated, specific to the pair of mentions being compared, during both training and prediction time. Such selective feature activation is done via activator functions. Whereas commonly existing systems may default to generating all features for every comparison, some embodiments of the present disclosure provide advantages via the use of activator functions by activating only relevant features. The set of activated features may be both deterministic and also a subset of the total feature set; the set may be deterministic in that a user may encode a priori in choosing the subset of features and thereby ensure an activation.

As an illustrative example, a superset 'S' of features={acronym match, category match, sub-string match, string mismatch}. Thus, cardinality of the set is S=4. In the setting of coreference resolution, if the pair of mentions that are being compared are, for example, "New York" and "NY", then acronym feature set activation can include the set of {acronym match, category match}. Note the lack of activation of the "string mismatch" feature. In some embodiments, weights of the "string mismatch" feature are not penalized, and only the weights of features that are activated are increased or decreased.

Implementing one or more aspects of selective feature activation functions as described above may provide several benefits and advantages, including the following. Feature selection may be completely user controlled, and the ability to reason over only a smaller and a selective set of features to perform resolution is enabled. This can be very useful in a supervised mechanism in which weights for only a subset of features need to be updated for every training example. In settings where feature computation is expensive, unnecessary computation of certain features may be avoided. Confidence in resolution may be established while also allowing for control precision. Absence of feature selection can default to the entire possible feature set; "possible" since features can be mutually exclusive. A null feature set is also permissible, as a null set may be helpful to not make any decision when the penalty of a mis-prediction is high. Also, the features are not limited to be Boolean and/or binary in generating similarity scores over the feature set, as both supervised and unsupervised frameworks can operate over string-valued features and not just binary valued features.

Figure 7:
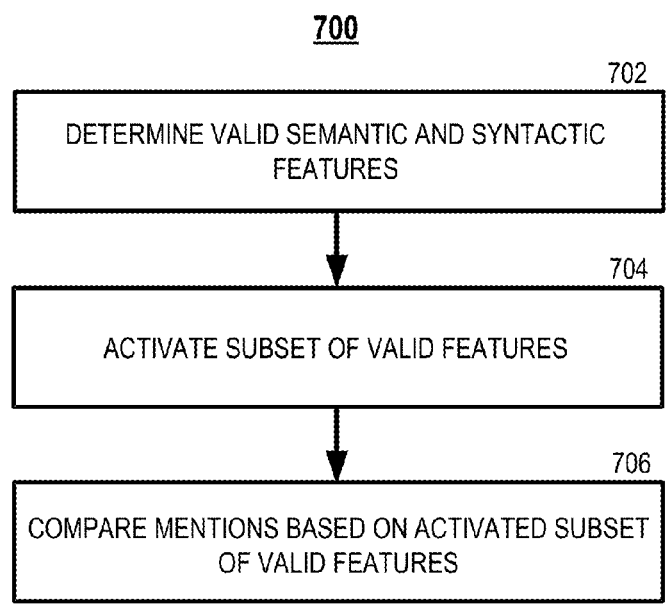
FIG. 7 is a flow diagram illustrating operations of a method for selective feature activation according to one example embodiment of the present disclosure.

FIG. 7 is a flow diagram illustrating operations of a method 700 according to one embodiment of the present disclosure. At operation 702, a plurality of semantic and syntactic features that are valid for comparing a particular pair of mentions of a plurality of mentions in a segment of text data are determined. Title comparison features, for example, are not valid when comparing a pronoun and a noun (as pronouns to not come with titles). At operation 704, only a subset of the valid features are activated. At operation 706, the pair of mentions are compared to each other based on the activated subset of valid features, such as to determine whether the pair of mentions refer to the same entity. The plurality of syntactic features can include one or more of string match, string mismatch, substring match, substring mismatch, acronym match, and partial name match. The plurality of semantic features can include one or more of same sentence, previous sentence, next sentence, and category match.

As referred to herein with respect to some embodiments of the present disclosure, "similarity" comparisons in the context of coreference resolution, or similarity "scores", may involve performing mathematical functions to compute a degree or amount of similarity between feature vectors of one mention (or entity, sub-entity, etc.) to another, and determining based on the degree or amount whether the two mentions are coreferent. Similarity computations according to embodiments of the present disclosure may use, as one example, cosine similarity functions ([1]) to compute the similarity between two vectors, which may involve computing the dot product of two vectors and dividing the result by the product of the lengths of the two vectors. Further general discussion of some aspects of features, feature vectors, and similarity computations associated with mentions, entities, sub-entities, etc. in coreference resolution as referred to herein may be found in U.S. Pat. No. 8,457,950 ([2]).

Global (cross-document) coreference resolution, as disclosed herein, can leverage local (in-document) coreference capabilities. Within a single document, an entity may be referred to one or more times in what may be called a "chain" (e.g., "She", "her", "Barbara", "Ms. Streisand", "famous singer"). The aggregate context (nearby words) for these mentions and other pertinent information (features) extracted from the text surrounding those mentions can form a signature for the chain. This chain signature can then be compared against chain signatures from other documents, and when a similar chain (e.g., "Barbara Streisand", "singer", "Ms. Streisand") has been identified, they can be deemed co-referent and collapsed into a larger structure containing the mentions of both. This larger group of mentions and its signature can then participate further in the comparison and combination process. Some embodiments of the present disclosure provide a framework to facilitate such similarity comparisons with advanced or complex similarity comparisons effectively on large scale data.

Figure 2:
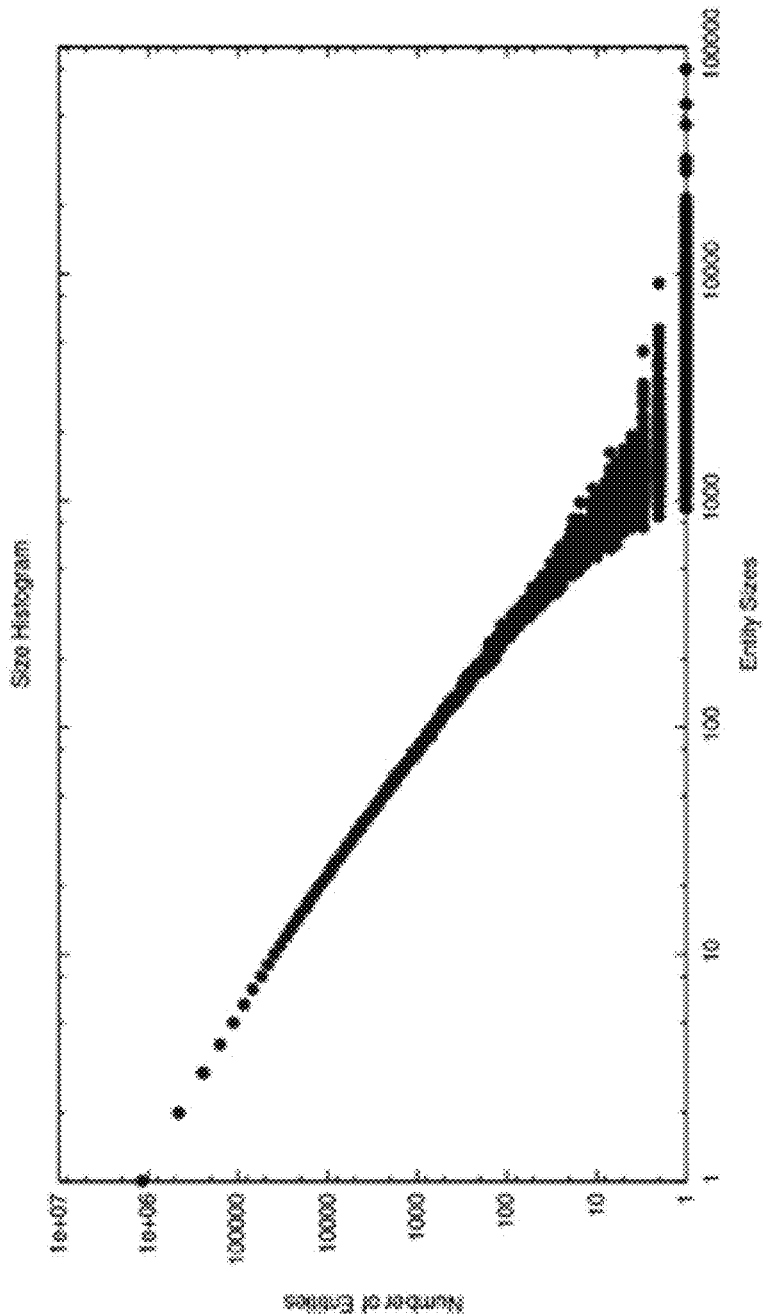
FIG. 2 illustrates a Zipfian-like data distribution.

Large scale corpuses containing a large number of instances or mentions of entities, for example a large number of documents that each includes many names of particular real-world individuals, may have a Zipfian-like distribution ([3]), such that size of an entity is inversely proportional to the number of similar entities (i.e., its rank). As will be recognized by those skilled in the art, a Zipfian distribution refers to a power law probability distribution in which in a given corpus of natural language utterances, the frequency of any word is inversely proportional to its rank in the frequency table. ([3], [4]). An example data set and representation of a distribution of entity sizes of this type, which was obtained from a Wiki-links data set (hereinafter referred to as "Wiki-links data") ([5]) is available in Singh et al., "Wikilinks: A Large-scale Cross-Document Coreference Corpus Labeled via Links to Wikipedia" (hereinafter also referred to as "Singh et al.") ([6]). FIG. 2 of the present drawings show a Zipfian-like distribution plot from Singh et al. (see [6] at page 10). Certain information present in the Wiki-links data ([5]) and Singh et al. ([6]) will be referred to herein in describing example embodiments and illustrative implementations that may utilize such data, for discussions of aspects of the present disclosure presented herein. However, it should be recognized that the data itself and/or the conventional plots of such data (e.g., histograms) are not intended to themselves be considered inventive aspects for purposes of the present disclosure.

In such a Zipfian-like distribution, an entity's frequency of occurrence can increase from left to right as viewed in a corresponding distribution plot (see FIG. 2) in which a size histogram has entity sizes along the x-axis and number-of-similar-entities along the y-axis. At the right side of such a corresponding distribution plot, terms like "Barack Obama" may be expected, which can have a very high frequency in a corpus of common news information, for example. And, there are very few entities having such high frequency of occurrence as that of "Obama." These entity groups are referred to as "large buckets" in FIG. 3, as the bucket size denotes the entity frequency of occurrence. At the left, there may be less frequent entities, for example those which occur only once or twice in the corpus. These less frequent names can be associated with a very high Y value (rank) because most such names in the corpus are less frequent. These entity groups are referred to as "small" buckets in FIG. 3. As such, frequency has a positive correlation with popularity.

A local coreference chain (which may also be referred to herein as a "coref" chain) can contain named entities, nominal references, and pronouns. When looking at named entity annotations, the longest available name can be a meaningful measure. If the longest name of chains is keyed on, the data distribution can follow a similar plot to that shown in FIG. 2. Such longest name may be referred to herein as the "power law id". A category may be added to separate a specific name of an institution from the location, for example. Also, vowels can be stripped off to account for typos and remove potential stop words based off lexicon lists. As an illustration, "Osama bin laden" may end up with the same power law id as "Usaama bin laden" if vowels are removed. As another illustration, "Apple Corporation" and "Apple Inc." would end up with the same power law id similarly, for example. Finding candidate coreferent entities faster can aid in minimizing the runtime for "convergence". Convergence can be generally defined as the graph state where running for more iterations would not yield any further statistically significant results.

When performing certain functions to cluster local coreference chains into concepts, a significant challenge can be the total number of chains to be processed. As an illustration, with an average of 5 chains per document, 100M documents equates to 500M chains. It may be that, in order to cluster chains into concepts, ideally each chain would be compared with every other chain. However, given C chains, this can mean $C^2$ comparisons, or in the case of 500M chains, 250 quadrillion comparisons. This may not be computationally tractable. To address this challenge, a procedure process referred to herein as "sub-entity classification" can be performed.

Figure 3:
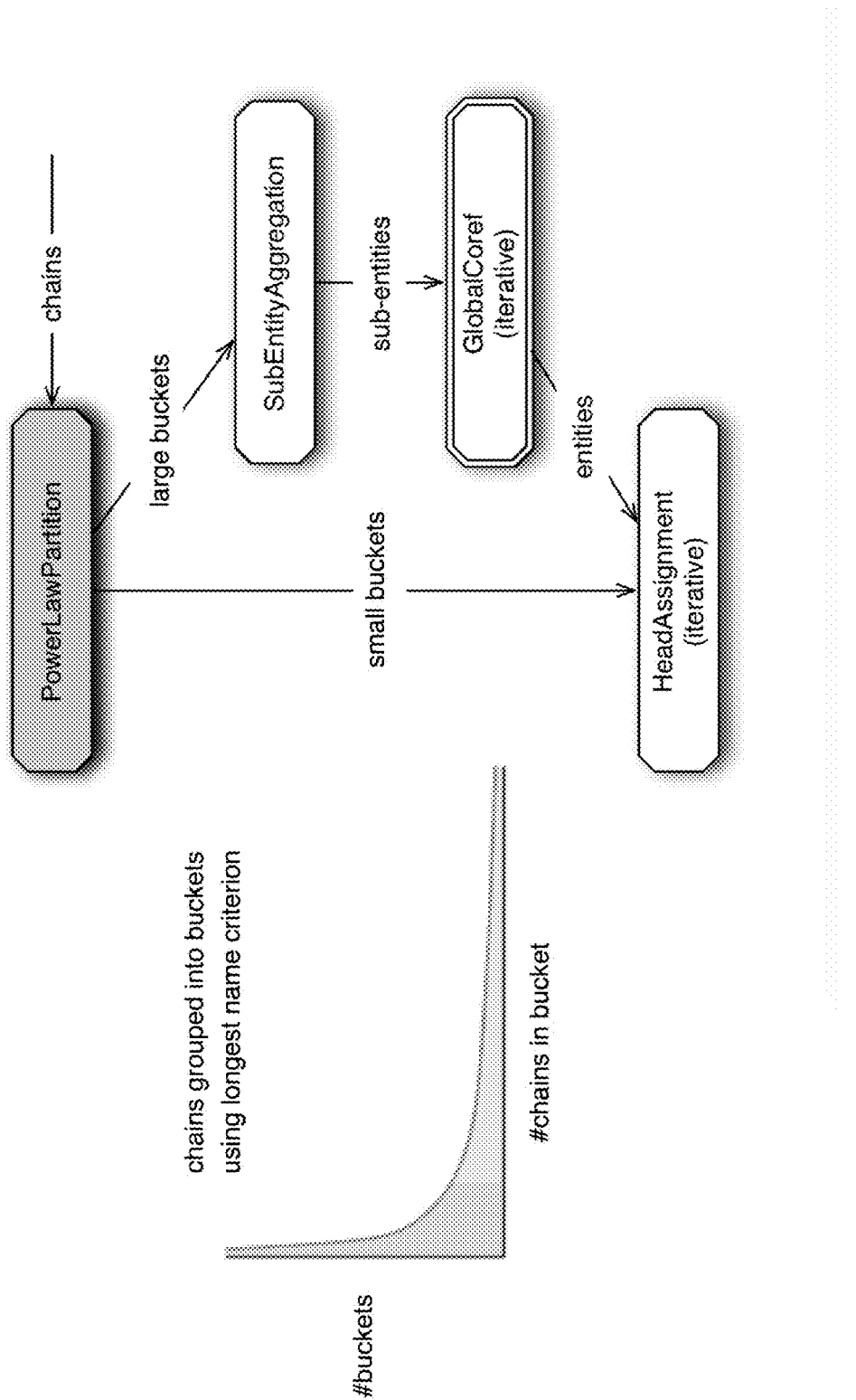
FIG. 3 illustrates data partitioning for computational efficiency according to some example embodiments of the present disclosure.
Figure 4:
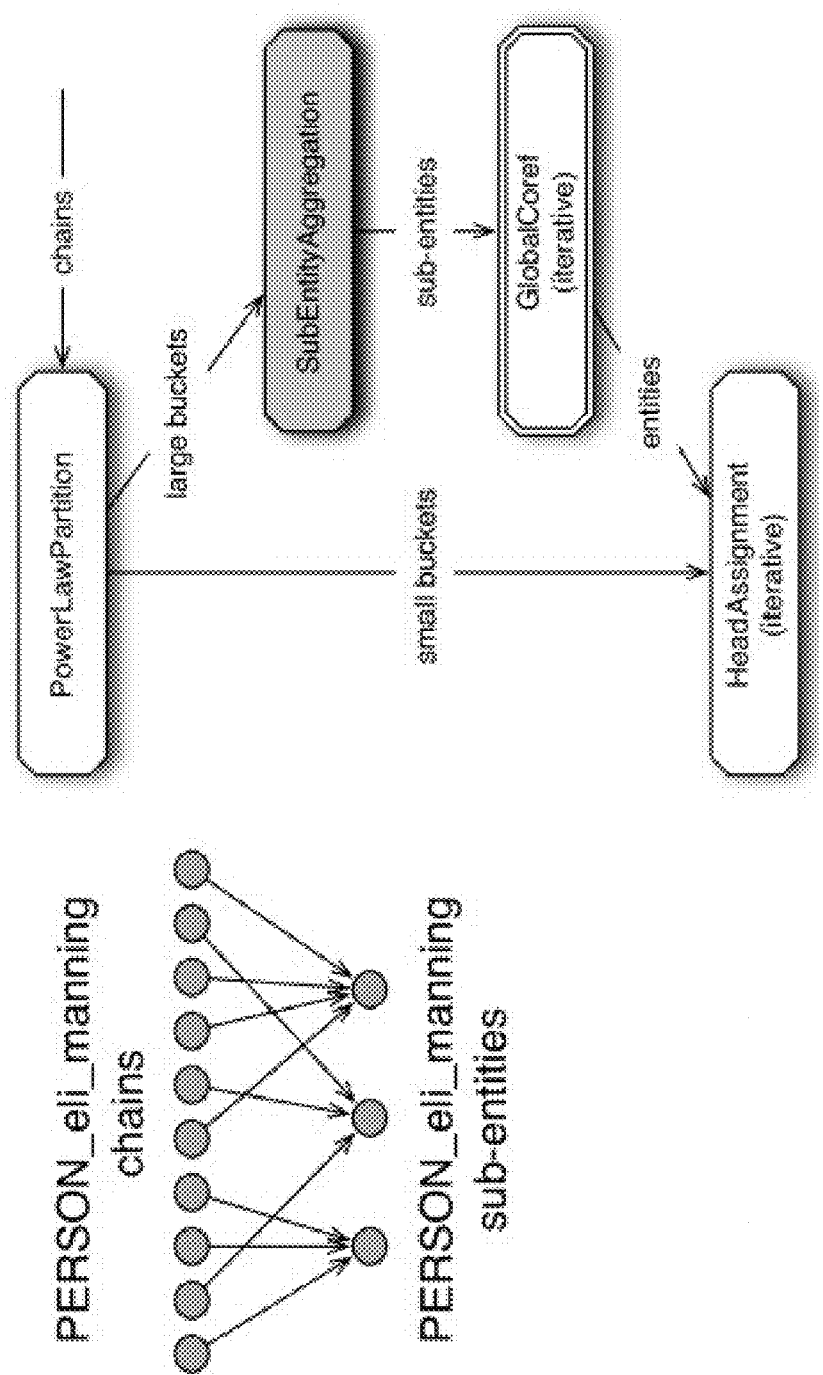
FIG. 4 illustrates aggregation of high likelihood in-document coreferent chains, according to some example embodiments of the present disclosure.

Now referring to "PowerLawPartition" in FIG. 3, local coreference chains can first be partitioned based on their category and longest-name-in-chain. That is, all chains with the same "category+longest-name-in-chain" power law id can be grouped together into a "bucket". Then, particular chains within a bucket can be grouped together into sub-entities, i.e., clusters of chains for which it is relatively reliable and fast to determine that they belong to the same concept (see "SubEntityAggregation" in FIG. 4, where "Eli Manning" sub-entities are created from "Eli Manning" chains whose power law id is PERSON_eli_manning) A desired effect is that the number of sub-entities (S) is substantially smaller than the number of chains (C), i.e., S<<C. As another effect, the features of the individual "Eli Manning" chains are aggregated to form the features of the sub-entities to which they are assigned, which is useful because it is computationally more efficient to compare a smaller number of sub-entities rather than a larger number of chains. The sub-entities can then be compared to one another, and those that refer to the same concept can be grouped together into this concept. In a bad case, there may be $S^2$ comparisons between sub-entities, but as S<<C, this can be computationally tractable.

Figure 6:
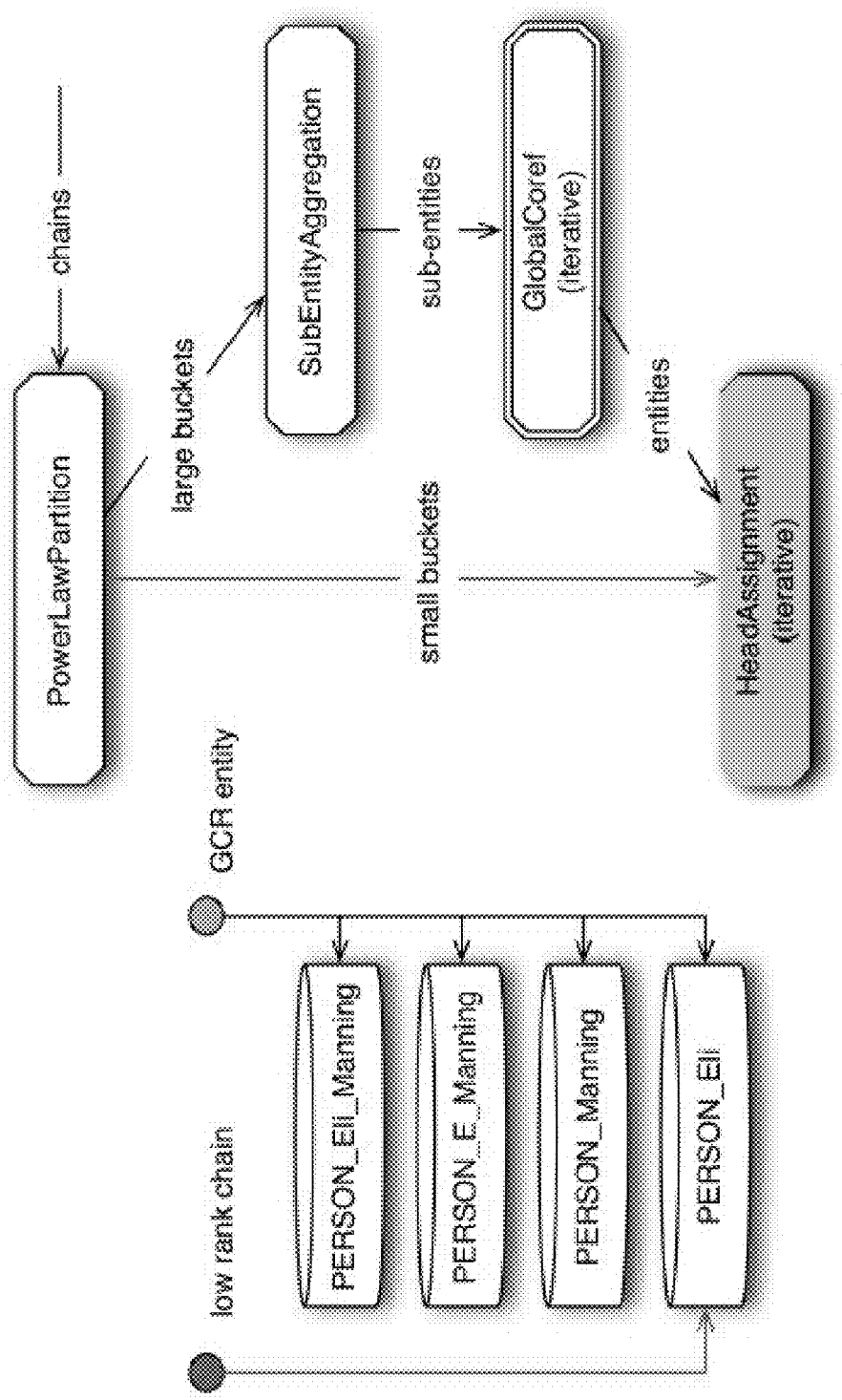
FIG. 6 illustrates utilization of corpus level entities to perform coreference resolution on filtered data, according to some embodiments of the present disclosure.

From the distribution shown in FIG. 2 and the Wiki-links data ([5]) and plots in Singh et al. ([6]), it may be observed that the number of entities starts to drop significantly once their size reaches 10. About 30% of Wiki-links data ([5]) belongs to entities whose max size is 10. Thus, a significant amount of data can have less frequency of appearance in the corpus, and can be referred to as the "head region" of a power law. This can be leveraged while performing global coreference (GC). Since, in accordance with some embodiments, the global coreference process is iterative there may not be a significant incentive in processing the head region in each iteration. Once global coreference functions have finished processing the data that excludes this head region (see "GlobalCoref(iterative)" in FIG. 5), then entities/concepts can be created and used to process the head region by finding coreferent entities (see "HeadAssignment(iterative)" in FIG. 6). Further details on these aspects will be presented below.

Global coreference functions can process the high confidence sub-entities created by the above clustering algorithm to improve the recall. Global coreference can use a mixture of contextual, named entity resolution (NER), edit distance, and gender/cardinality based features There may be some randomness in this section, so a high pass filter can be utilized to clean up decisions of less precision. A high pass filter can create only high similarity clusters while filtering or breaking apart low similarity clusters. Across iterations, data can be shuffled across parallel processing machines so that different sub-entities can end up in the same partition for comparison. The head region can be processed by utilizing GC-created entities, wherein an iterative algorithm can be run to find coreferent entities for the data in the head region (see "HeadAssignment(iterative)" in FIG. 6). The assignment of data in the head region may only be performed when a suitable match is found. In some embodiments of the present disclosure, "super-entity ids" can be used in partitioning the data and henceforth may also be referred to as "partition ids." The construction of partition ids according to some embodiments is described in further detail below.

Some illustrations of embodiments of the present disclosure are described herein with reference to the example term "bush", in part because in a given corpus, "bush" can be an ambiguous term in that it might ultimately be referring to a plant or alternatively to one of either George H. W. Bush or George W. Bush. Since a local coreference chain can contain all the variants of the term "bush", local to each document, then as long as the longest name from the chain can be obtained and used in partitioning, acceptable coreferent entities can be produced in a short period of time. The following Table illustrates an example for the partition ids generated for a "George W. Bush" chain.

| Choice | Weight |
| --- | --- |
| George W. Bush | 4.0 |
| Grg W Bsh | 3.0 |
| GWB | 3.0 |
| George | 2.0 |
| Soundex(George) | 2.0 |
| Bush | 2.0 |
| Soundex(Bush) | 2.0 |
| Grg | 1.0 |
| Bsh | 1.0 |

The Bush chain iteratively changes its partition id using these choices, hoping other "bush" variant chains end up in the same partition if it ends up choosing the same id. This can improve the convergence rate.

Cumulative runs can provide the ability to efficiently resolve concepts across multiple ingests. This can come in two types: default run and incremental run. The default run can resort to running full workflow to not only perform resolution of the new data but also support modification of existing concepts. The incremental run can use a specialized workflow to quickly determine the resolution for the incoming data without actually breaking apart previous concepts.

As discussed above with respect to some embodiments, sub-entities can be created using incoming chains and their naming scheme ids during power law clustering. An objective can be to re-create only the part of a coreference hierarchy graph (see FIG. 1) that the new ingest corresponds to, without having to re-compute the entire coreference graph. The following describes how this overlap can be determined. It can be noted that there may be no incentive in re-creating the exact same, for example, "George Bush" and "Nicola Tesla" sub-entities if all the new incoming chains correspond to "Barack Obama" and "Christopher Manning" sub-entities, for example. Certain implementations keep track of the changes in the number of chains ("#chains") corresponding to a given naming scheme id across runs. If this count has not changed in the succeeding ingest, then the coreference hierarchy graph corresponding to these unmodified sub-entities can be restored. That is, if "George Bush", "Bush", "President Bush" sub-entities are resolved in the previous run and the counts for these naming scheme ids has not changed in the succeeding run, then an implementation can automatically start off using this resolved state.

With regard to chains that that may affect a naming scheme id, power law clustering can be run on these chains, giving the capability to create brand new sub-entities corresponding to this naming scheme id. This can be very advantageous and useful in supporting the notion that new incoming chains can break and/or modify sub-entities from the previous run. For such newly created sub-entities, then a best-guess can also be performed for its parent entity, by looking at the previous entity ids of the chains in the newly created sub-entity. If the majority or all of the chains are indicated to belong to a particular entity, this sub-entity can be attached as a child to the particular entity. If, however, there is no substantial supporting majority and/or evidence, it can be created as a singleton and internally stored in a factor graph (see mathematical representation of the hierarchy shown in FIG. 1), and the adaptive partition ids and the randomness of the algorithm can be relied on for resolution; and, global coreference can perform its functions and either accept or reject the best guesses. In some embodiments, the present disclosure can utilize an "incremental run" can be used to support low latency, using certain techniques that are similar or variations of techniques employed in relation to the implementations discussed above for processing the head region.

Figure 8:
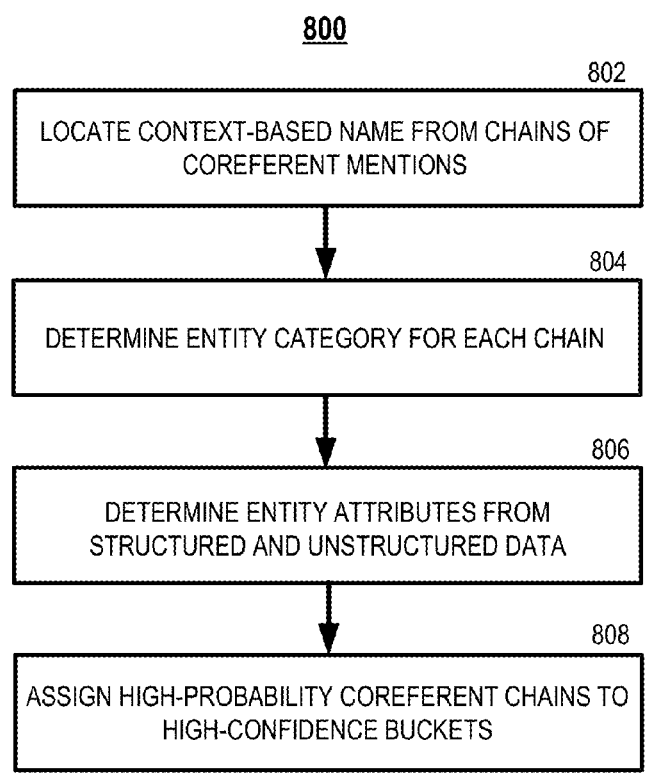
FIG. 8 is a flow diagram illustrating operations of a method for coreference resolution according to one example embodiment of the present disclosure.

FIG. 8 is a flow diagram illustrating operations of a method 800 according to one embodiment of the present disclosure. At operation 802, for each of a selected plurality of chains of coreferent mentions, a particular context-based name is located from the respective chain. The coreferent mentions correspond to entities and the context-based name is a longest name in the respective coreference chain or a last name in the respective coreference chain. At operation 804, an entity category is determined for each respective one of the plurality of chains. At operation 806, one or more entity attributes are determined from structured data and unstructured data. At operation 808, high-probability coreferent chains are assigned to high-confidence buckets, based on the located particular context-based name, the entity category, and the one or more attributes, such as to produce a Zipfian-like distribution having a head region and a tail region.

The framework according to some embodiments discussed above can support computationally efficient way of resolving entities provided in structured data with entities automatically extracted from unstructured data. Structured data typically refers to tabular data where rows correspond to entities and columns correspond to attributes about the entities or vice-versa. For example, a list of employees with attributes such as gender, date of birth etc. Similarly, a news document is an example of unstructured data.

Structured data entities can be partitioned into head and tail regions such as to minimize any wasteful comparisons that can occur if the structured data entities do not correspond to the entities extracted from the unstructured data. As an example, if the structured data entities are extracted from publicly known corpuses such as FREEBASE ([7]) and if the unstructured data corresponds to current financial news documents, then most or all structured data entities referring to historic popular figures will likely not be coreferent with any entities coming from financial data, for example.

The partitioning of structured data entities can be performed in a similar manner to that of partitioning for unstructured data entities. Structured data entities may contain known aliases for an entity (i.e., other than its given name). Structured data entities can also contain category or type information that specifies if the particular entity is a person or organization or "other." This category or type information can be used in constructing multiple naming scheme ids for a given structured data entity. These naming scheme ids can be simultaneously used in determining the region to which the entity belongs. In one such implementation, if it can be determined that any such naming scheme id corresponds to an id from unstructured data that is assigned to the tail region, then this structured data entity is assigned to the tail region. If instead these naming scheme id options are never assigned to the tail region in the unstructured data entities, then this entity is assigned to head region. Entities from both the sources (unstructured and structured) can then be resolved using the same iterative global coreference and head assignment processes.

Figure 9:
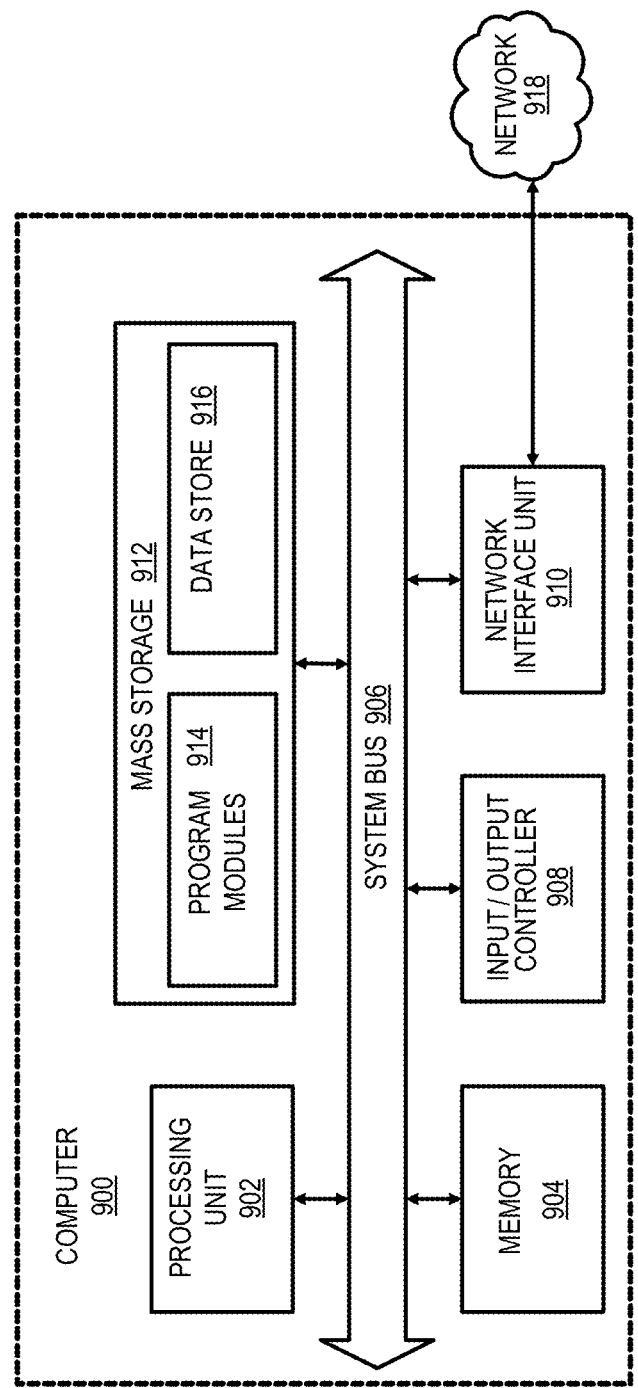
FIG. 9 is a computing architecture diagram of a computing system capable of implementing one or more example embodiments of the present disclosure.

FIG. 9 is a computer architecture diagram showing a general computing system capable of implementing one or more embodiments of the present disclosure described herein. A computer 900 may be configured to perform one or more functions associated with embodiments illustrated in one or more of FIGS. 1-8. It should be appreciated that the computer 900 may be implemented within a single computing device or a computing system formed with multiple connected computing devices. For example, the computer 900 may be configured for a server computer, desktop computer, laptop computer, or mobile computing device such as a smartphone or tablet computer, or the computer 900 may be configured to perform various distributed computing tasks, which may distribute processing and/or storage resources among the multiple devices.

As shown, the computer 900 includes a processing unit 902, a system memory 904, and a system bus 906 that couples the memory 904 to the processing unit 902. The computer 900 further includes a mass storage device 912 for storing program modules. The program modules 914 may include modules executable to perform one or more functions associated with embodiments illustrated in one or more of FIGS. 1-8. The mass storage device 912 further includes a data store 916.

The mass storage device 912 is connected to the processing unit 902 through a mass storage controller (not shown) connected to the bus 906. The mass storage device 912 and its associated computer storage media provide non-volatile storage for the computer 900. By way of example, and not limitation, computer-readable storage media (also referred to herein as "computer-readable storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900. Computer-readable storage media as described herein does not include transitory signals.

According to various embodiments, the computer 900 may operate in a networked environment using connections to other local or remote computers through a network 918 via a network interface unit 910 connected to the bus 906. The network interface unit 910 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 900 may also include an input/output controller 908 for receiving and processing input from a number of input devices. Input devices may include one or more of keyboards, mice, stylus, touchscreens, audio capturing devices, or image/video capturing devices. An end user may utilize such input devices to interact with a user interface, for example a graphical user interface, for managing various functions performed by the computer 900.

The bus 906 may enable the processing unit 902 to read code and/or data to/from the mass storage device 912 or other computer-storage media. The computer-storage media may represent apparatus in the form of storage elements that are implemented using any suitable technology, including but not limited to semiconductors, magnetic materials, optics, or the like. The program modules 914 may include software instructions that, when loaded into the processing unit 902 and executed, cause the computer 900 to provide functions associated with embodiments illustrated in FIGS. 1-8. The program modules 914 may also provide various tools or techniques by which the computer 900 may participate within the overall systems or operating environments using the components, flows, and data structures discussed throughout this description. In general, the program module 914 may, when loaded into the processing unit 902 and executed, transform the processing unit 902 and the overall computer 900 from a general-purpose computing system into a special-purpose computing system.

The processing unit 902 may be constructed from any number of transistors or other discrete circuit elements, which may individually or collectively assume any number of states. More specifically, the processing unit 902 may operate as a finite-state machine, in response to executable instructions contained within the program modules 914. These computer-executable instructions may transform the processing unit 902 by specifying how the processing unit 902 transitions between states, thereby transforming the transistors or other discrete hardware elements constituting the processing unit 902. Encoding the program modules 914 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 914 may transform the physical state of the semiconductor memory, when the software is encoded therein. For example, the program modules 914 may transform the state of transistors, capacitors, or other discrete circuit elements constituting the semiconductor memory.

As another example, the computer-readable storage media may be implemented using magnetic or optical technology. In such implementations, the program modules 914 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Although some embodiments described herein have been described in language specific to computer structural features, methodological acts and by computer readable media, it is to be understood that the disclosure defined in the appended claims is not necessarily limited to the specific structures, acts or media described. Therefore, the specific structural features, acts and mediums are disclosed as exemplary embodiments implementing the claimed disclosure.

The various embodiments described above are provided by way of illustration only and should not be construed to limit the scope of the present disclosure. Those skilled in the art will readily recognize various modifications and changes that may be made to the present disclosure without following the example embodiments and applications illustrated and described herein, and without departing from the true spirit and scope of the present disclosure as set forth in the appended claims.

REFERENCES

[1] "Cosine Similarity", available online at: http://en.wikipedia.org/wiki/Cosine_similarity (accessed Mar. 6, 2015)
[2] U.S. Pat. No. 8,457,950, issued Jun. 4, 2013 ("System and Method for Coreference Resolution").
[3] "Zipf's Law", available online at: http://en.wikipedia.org/wiki/Zipfs_law (accessed June Mar. 4, 2015).
[4] György Dan et al., "Power-law Revisited: Large Scale Measurement Study of P2P Content Popularity." IPTPS (April 2010).
[5] "Wiki-links Data," available online at: http://code.google.com/p/wiki-links/downloads/list (accessed Jun. 25, 2015).
[6] Sameer Singh et al., "Wikilinks: A Large-scale Cross-Document Coreference Corpus Labeled via Links to Wikipedia" (October 2012).
[7] Freebase, available online at: http://www.freebase.com (accessed Mar. 4, 2015).

What is claimed is:

1. A computer-implemented method, comprising:
ingesting text data from a plurality of documents containing a plurality of mentions;
locating, from the text data, for each of a selected plurality of chains of coreferent mentions, a particular context-based name from the respective chain, wherein the coreferent mentions correspond to entities and the context-based name is a longest name in the respective chain, a last name in the respective chain, or a most frequently occurring name in the respective chain;
determining an entity category for each respective one of the plurality of chains;
determining one or more entity attributes from structured data and unstructured data;
based on the located particular context-based name, the entity category, and the one or more attributes, assigning high-probability coreferent chains to high-confidence buckets, such as to produce a power law probability distribution having a head region and a tail region; and
resolving, based at least in part on the power law probability distribution, the coreferent mentions to identify corresponding real-world entities.

2. The method of claim 1, wherein the power law probability distribution is produced such that the respective rank of a particular chain corresponding to a context-based name is inversely proportional to the frequency of the context-based name across a document corpus.

3. The method of claim 1, wherein assigning the high-probability chains to the high-confidence buckets comprises:
grouping the plurality of chains based on the respective context-based name and category such that chains having a same context-based name and same category are grouped together into a respective partition;
within the respective partition, grouping chains that correspond to the same concept into sub-entities; and
grouping together the sub-entities, across and within partitions, that correspond to the same concept.

4. The method of claim 1, further comprising:
assigning one or more low-frequency sub-entities into the head region; and
assigning one or more high-frequency sub-entities into the tail region, wherein the low-frequency sub-entities correspond to mentions that occur less frequently across a document corpus than the mentions corresponding to the high-frequency sub-entities.

5. The method of claim 4, further comprising:
performing iterative global coreference resolution functions on the sub-entities assigned to the tail region, based on similarity comparison functions;
performing, in a fully distributed computing environment, shuffling functions on the sub-entities assigned to the tail region such as to improve the rate of coreference resolution;
applying a high-pass filter to generate only high-confidence resolved entities at the end of each iteration of performing the iterative global coreference functions; and
performing feature aggregation to produce representations of entities from coreferent sub-entities.

6. The method of claim 5, further comprising:
selecting iterative random combinations of sub-entities based on similarity comparisons between sub-entities of the head region and based on the entities created from the coreferent sub-entities of the tail region.

7. The method of claim 1, further comprising:
determining overlap of incoming data with data in an existing coreference hierarchy by assigning the high-probability coreferent chains to the high-confidence buckets;
performing computations on an overlapping region of the distribution that corresponds to the determined overlap, and restoring the computations from the previous state for the remainder of the head region and tail region; and
performing best entity guesses for the newly-computed sub-entities in the overlapping region to aid resolution, the best entity guesses corresponding to an estimation of an entity to which each of the newly-computed sub-entities corresponds.

8. The method of claim 1, further comprising:
persisting the entity data structures;

performing random sampling algorithm functions based on predetermined similarity comparisons and intelligent shuffling between new incoming data and the persisted entities from previous runs; and creating new entities on an as-needed basis for further runs.

9. The method of claim 1, further comprising:

computing, using one or more similarity functions, one or more similarity metrics corresponding to at least one of contextual similarity, name similarity, title similarity, and attribute similarity simultaneously to determine coreference of a pair of sub-entities or a pair of entities.

10. The method of claim 1, further comprising:

generating, based on the assigning of the high-probability coreferent chains to high-confidence buckets, candidates for structured entities;

determining overlap between identified high-confidence buckets of both structured data and unstructured data; and for non-zero overlap, allotting structured entities to the tail region and, for trivial overlap, allotting structured entities in the head region such as to enhance a rate of the unstructured-structured data resolution.

11. A system, comprising:

one or more processors;

a memory device operatively coupled to the one or more processors and storing instructions that, when executed by the one or more processors, cause the system to perform functions that comprise:

ingesting text data from a plurality of documents containing a plurality of mentions;

locating, from the text data, for each of a selected plurality of chains of coreferent mentions, a particular context-based name from the respective chain, wherein the coreferent mentions correspond to entities and the context-based name is a longest name in the respective chain, a last name in the respective chain, or a most frequently occurring name in the respective chain;

determining an entity category for each respective one of the plurality of chains;

determining one or more entity attributes from structured data and unstructured data;

based on the located particular context-based name, the entity category, and the one or more attributes, assigning high-probability coreferent chains to high-confidence buckets, such as to produce a power law probability distribution having a head region and a tail region; and resolving, based at least in part on the power law probability distribution, the coreferent mentions to identify corresponding real-world entities.

12. The system of claim 11, wherein the power law probability distribution is produced such that the respective rank of a particular chain corresponding to a context-based name is inversely proportional to the frequency of the context-based name across a document corpus.

13. The system of claim 11, wherein assigning the high-probability chains to the high-confidence buckets comprises:

grouping the plurality of chains based on the respective context-based name and category such that chains having a same context-based name and same category are grouped together into a respective partition;

within the respective partition, grouping chains that correspond to the same concept into sub-entities; and grouping together, across and within partitions, the sub-entities that correspond to the same concept.

14. The system of claim 11, wherein the stored instructions, when executed by the one or more processors, further cause the system to perform functions that comprise:

assigning one or more low-frequency sub-entities into the head region; and assigning one or more high-frequency sub-entities into the tail region, wherein the low-frequency sub-entities correspond to mentions that occur less frequently across a document corpus than the mentions corresponding to the high-frequency sub-entities.

15. The system of claim 14, wherein the stored instructions, when executed by the one or more processors, further cause to the system to perform functions that comprise:

performing iterative global coreference resolution functions on the sub-entities assigned to the tail region, based on similarity comparison functions;

performing, in a fully distributed computing environment, shuffling functions on the sub-entities assigned to the tail region such as to improve the rate of coreference resolution;

applying a high-pass filter to generate only high-confidence resolved entities at the end of each iteration of performing the iterative global coreference functions; and performing feature aggregation to produce representations of entities from coreferent sub-entities.

16. The system of claim 15, wherein the stored instructions, when executed by the one or more processors, further cause to the system to perform functions that comprise:

selecting iterative random combinations of sub-entities based on similarity comparisons between sub-entities of the head region and based on the entities created from the coreferent sub-entities of the tail region.

17. The system of claim 11, wherein the stored instructions, when executed by the one or more processors, further cause the system to perform functions that comprise:

determining overlap of incoming data with data in an existing coreference hierarchy by assigning the high-probability coreferent chains to the high-confidence buckets;

performing computations on an overlapping region of the distribution that corresponds to the determined overlap, and restoring the computations from the previous state for the remainder of the head region and tail region; and performing best entity guesses for the newly-computed sub-entities in the overlapping region to aid resolution, the best entity guesses corresponding to an estimation of an entity to which each of the newly-computed sub-entities corresponds.

18. The system of claim 11, wherein the stored instructions, when executed by the one or more processors, further cause to the system to perform functions that comprise:

persisting the entity data structures;

performing random sampling algorithm functions based on predetermined similarity comparisons and intelligent shuffling between new incoming data and the persisted entities from previous runs; and creating new entities on an as-needed basis for further runs.

19. The system of claim 11, wherein the stored instructions, when executed by the one or more processors, further cause to the system to perform functions that comprise:

computing, using one or more similarity functions, one or more similarity metrics corresponding to at least one of contextual similarity, name similarity, title similarity, and attribute similarity simultaneously to determine coreference of a pair of sub-entities or a pair of entities.

20. The system of claim 11, wherein the stored instructions, when executed by the one or more processors, further cause to the system to perform functions that comprise:
  generating, based on the assigning of the high-probability coreferent chains to high-confidence buckets, candidates for structured entities;
  determining overlap between identified high-confidence buckets of both structured data and unstructured data; and
  for non-zero overlap, allotting structured entities to the tail region and, for trivial overlap, allotting structured entities in the head region such as to enhance a rate of the unstructured-structured data resolution.

21. A non-transitory computer-readable medium storing instructions that, when executed by one or more processors, cause a computer to perform functions that comprise:
  ingesting text data from a plurality of documents containing a plurality of mentions;
  locating, from the text data, for each of a selected plurality of chains of coreferent mentions, a particular context-based name from the respective chain, wherein the coreferent mentions correspond to entities and the context-based name is a longest name in the respective chain, a last name in the respective chain, or a most frequently occurring name in the respective chain;
  determining an entity category for each respective one of the plurality of chains;
  determining one or more entity attributes from structured data and unstructured data;
  based on the located particular context-based name, the entity category, and the one or more attributes, assigning high-probability coreferent chains to high-confidence buckets, such as to produce a power law probability distribution having a head region and a tail region; and
  resolving, based at least in part on the power law probability distribution, the coreferent mentions to identify corresponding real-world entities.

22. The non-transitory computer-readable medium of claim 21, wherein the power law probability distribution is produced such that the respective rank of a particular chain corresponding to a context-based name is inversely proportional to the frequency of the context-based name across a document corpus.

23. The non-transitory computer-readable medium of claim 21, wherein assigning the high-probability chains to the high-confidence buckets comprises:
  grouping the plurality of chains based on the respective context-based name and category such that chains having a same context-based name and same category are grouped together into a respective partition;
  within the respective partition, grouping chains that correspond to the same concept into sub-entities; and
  grouping together, across and within partitions, the sub-entities that correspond to the same concept.

24. The non-transitory computer-readable medium of claim 21, wherein the stored instructions, when executed by the one or more processors, further cause the computer to perform functions that comprise:
  assigning one or more low-frequency sub-entities into the head region; and
  assigning one or more high-frequency sub-entities into the tail region, wherein the low-frequency sub-entities correspond to mentions that occur less frequently across a document corpus than the mentions corresponding to the high-frequency sub-entities.

25. The non-transitory computer-readable medium of claim 24, wherein the stored instructions, when executed by the one or more processors, further cause to the computer to perform functions that comprise:
  performing iterative global coreference resolution functions on the sub-entities assigned to the tail region, based on similarity comparison functions;
  performing, in a fully distributed computing environment, shuffling functions on the sub-entities assigned to the tail region such as to improve the rate of coreference resolution;
  applying a high-pass filter to generate only high-confidence resolved entities at the end of each iteration of performing the iterative global coreference functions; and
  performing feature aggregation to produce representations of entities from coreferent sub-entities.

26. The non-transitory computer-readable medium of claim 25, wherein the stored instructions, when executed by the one or more processors, further cause to the computer to perform functions that comprise:
  selecting iterative random combinations of sub-entities based on similarity comparisons between sub-entities of the head region and based on the entities created from the coreferent sub-entities of the tail region.

27. The non-transitory computer-readable medium of claim 21, wherein the stored instructions, when executed by the one or more processors, further cause to the computer to perform functions that comprise:
  determining overlap of incoming data with data in an existing coreference hierarchy by assigning the high-probability coreferent chains to the high-confidence buckets;
  performing computations on an overlapping region of the distribution that corresponds to the determined overlap, and restoring the computations from the previous state for the remainder of the head region and tail region; and
  performing best entity guesses for the newly-computed sub-entities in the overlapping region to aid resolution, the best entity guesses corresponding to an estimation of an entity to which each of the newly-computed sub-entities corresponds.

28. The non-transitory computer-readable medium of claim 21, wherein the stored instructions, when executed by the one or more processors, further cause to the computer to perform functions that comprise:
  persisting the entity data structures;
  performing random sampling algorithm functions based on predetermined similarity comparisons and intelligent shuffling between new incoming data and the persisted entities from previous runs; and
  creating new entities on an as-needed basis for further runs.

29. The non-transitory computer-readable medium of claim 21, wherein the stored instructions, when executed by the one or more processors, further cause to the computer to perform functions that comprise:
  computing, using one or more similarity functions, one or more similarity metrics corresponding to at least one of contextual similarity, name similarity, title similarity, and attribute similarity simultaneously to determine coreference of a pair of sub-entities or a pair of entities.

30. The non-transitory computer-readable medium of claim 11, wherein the stored instructions, when executed by the one or more processors, further cause to the computer to perform functions that comprise:
  generating, based on the assigning of the high-probability coreferent chains to high-confidence buckets, candidates for structured entities;

determining overlap between identified high-confidence buckets of both structured data and unstructured data; and for non-zero overlap, allotting structured entities to the tail region and, for trivial overlap, allotting structured entities in the head region such as to enhance a rate of the unstructured-structured data resolution.

* * * * *